(12) United States Patent
Petersen

(10) Patent No.: US 9,974,281 B1
(45) Date of Patent: May 22, 2018

(54) FLYING PET TREAT

(71) Applicant: Royal Pet Incorporated, Inver Grove Heights, MN (US)

(72) Inventor: Troy Petersen, Rosemount, MN (US)

(73) Assignee: Royal Pet Incorporated, Inver Grove Heights, MN (US)

( * ) Notice: Subject to any disclaimer, the term of this patent is extended or adjusted under 35 U.S.C. 154(b) by 156 days.

(21) Appl. No.: 15/191,186

(22) Filed: Jun. 23, 2016

(51) Int. Cl.
*A01K 15/02* (2006.01)
*A23K 1/16* (2006.01)
*A23K 10/30* (2016.01)
*A23K 10/35* (2016.01)
*A23K 10/33* (2016.01)
*A23K 50/42* (2016.01)

(52) U.S. Cl.
CPC ............ *A01K 15/026* (2013.01); *A23K 10/30* (2016.05); *A23K 10/33* (2016.05); *A23K 10/35* (2016.05); *A23K 50/42* (2016.05)

(58) Field of Classification Search
CPC ...... A23K 1/143; A23K 40/00; A01K 15/026; A01K 15/025
USPC ........ 119/709, 710, 707; 426/805, 512, 635, 426/549, 623
See application file for complete search history.

(56) References Cited

U.S. PATENT DOCUMENTS

| 2,604,404 | A | * | 7/1952 | Genjack | A21D 13/48 |
| | | | | | 426/75 |
| D273,814 | S | * | 5/1984 | Gellman | D1/199 |
| 4,919,083 | A | * | 4/1990 | Axelrod | A01K 15/025 |
| | | | | | 119/710 |
| D340,121 | S | * | 10/1993 | Russell | D1/112 |
| 5,553,570 | A | * | 9/1996 | VanNatter, III | A01K 15/025 |
| | | | | | 119/51.01 |
| D523,592 | S | * | 6/2006 | Wang | D30/160 |
| D545,510 | S | * | 6/2007 | Viola | D30/160 |
| D565,826 | S | * | 4/2008 | Zaragoza | D1/120 |
| D572,426 | S | * | 7/2008 | McCollum | D1/106 |
| D683,516 | S | * | 6/2013 | Elias | D1/106 |
| 8,453,609 | B2 | * | 6/2013 | McCann | A01K 15/025 |
| | | | | | 119/709 |
| D700,755 | S | * | 3/2014 | Reiss | D30/121 |
| D779,776 | S | * | 2/2017 | Petersen | D1/120 |
| D801,620 | S | * | 11/2017 | Falcone | D1/101 |
| D802,250 | S | * | 11/2017 | Brunner | D1/106 |
| 2002/0017759 | A1 | * | 2/2002 | McClung, III | A01K 15/025 |
| | | | | | 273/317 |
| 2005/0039696 | A1 | * | 2/2005 | Springer | A01K 15/026 |
| | | | | | 119/709 |
| 2005/0214349 | A1 | * | 9/2005 | Nie | A23K 40/20 |
| | | | | | 424/442 |

(Continued)

*Primary Examiner* — Yvonne R Abbott-Lewis
(74) *Attorney, Agent, or Firm* — Peter J. Ims; Westman, Champlin & Keohler, P.A.

(57) ABSTRACT

A starch-based flying pet treat comprising, compositionally, a starch-based edible material. The treat has an overall circular shape formed by a center ring providing a first surface area and at least one wing integrally extending from the center ring and providing a second surface. Apertures are positioned in the surface areas to provide a high glide ratio such that the treat is configured to fly through the air when thrown. The treat is throwable for exercising a pet such that the pet chases or retrieves the flying pet treat and is rewarded with an edible pet treat for chewing and consumption.

17 Claims, 4 Drawing Sheets

(56) References Cited

U.S. PATENT DOCUMENTS

| | | | | |
|---|---|---|---|---|
| 2007/0224131 A1* | 9/2007 | McCollum | ............ | A01K 15/026 424/49 |
| 2008/0029045 A1* | 2/2008 | Willinger | ............. | A01K 15/026 119/710 |
| 2009/0120372 A1* | 5/2009 | Townsend | ............ | A01K 15/025 119/709 |
| 2013/0167778 A1* | 7/2013 | Perry | ................... | A01K 15/025 119/707 |
| 2013/0273125 A1* | 10/2013 | Barnvos | ................. | A01K 29/00 424/401 |
| 2015/0313185 A1* | 11/2015 | Barnvos | ............... | A01K 15/026 119/709 |

* cited by examiner

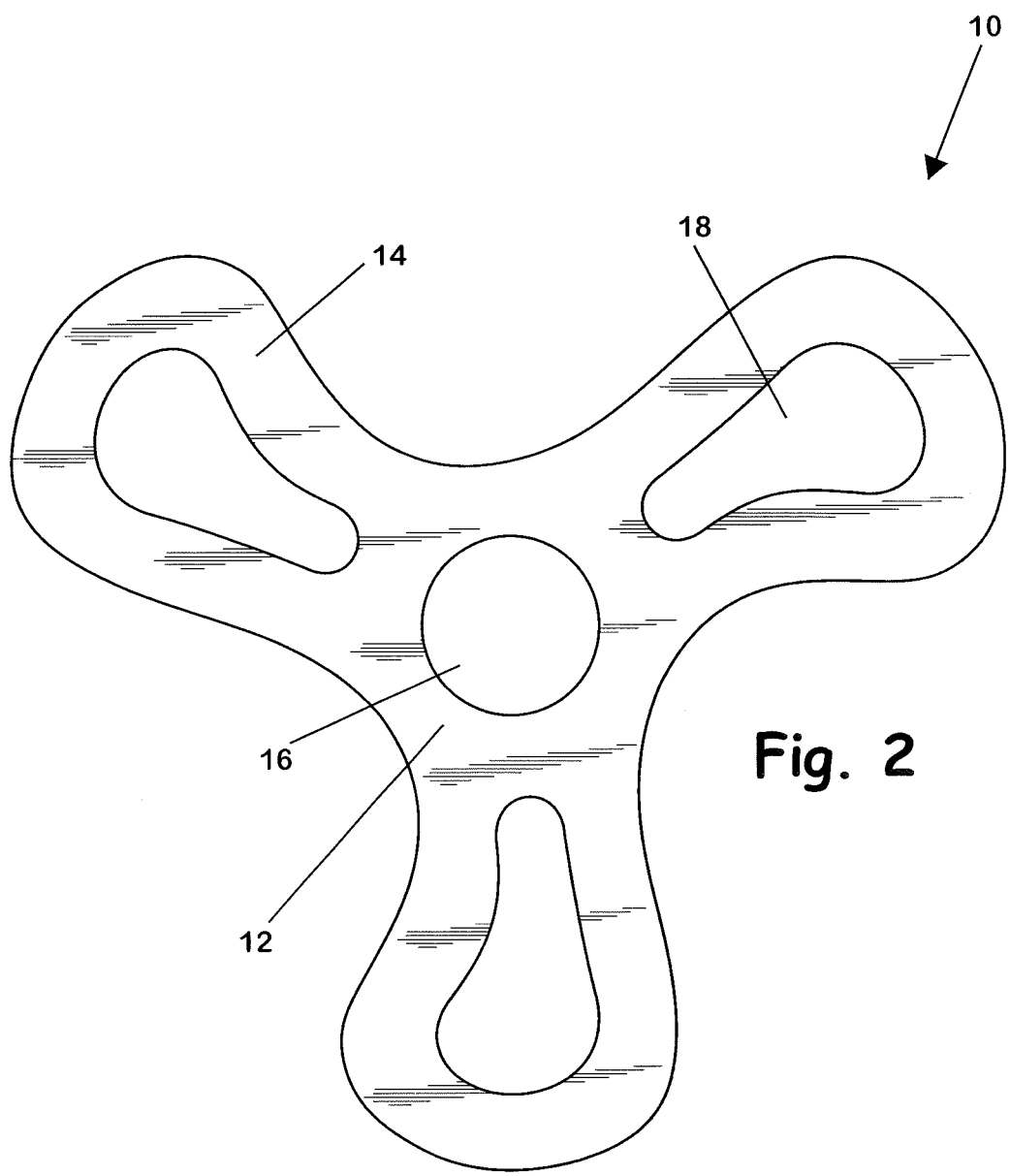

FLYING PET TREAT

BACKGROUND OF THE INVENTION

The present invention relates to a flying pet treat. More specifically, the present invention relates to a combination pet toy and pet treat wherein the device is a throwable, or flying, and edible pet toy and treat.

Generally, flying or throwable toys for pets, such as dogs, are formed of rubber, plastic, or fabric. These materials can readily be formed into shapes such as saucers, disks, or boomerangs that glide for long distances, allowing a dog to be exercised with minimal owner effort. When exercising a pet, or when training a pet, the pet is usually rewarded with a treat. For example, when playing fetch with a dog, the dog is generally gives a treat as positive reinforcement for fetching or as a reward or treat for playing. The treat is usually carried separately by the pet owner and given to the pet after the pet returns or finishes playing with a toy that is now dirty and/or covered in various materials (e.g. dirt, mud, pet saliva etc.).

Generally, pet treats or chew toys comprise animal based products such as bones from rawhide (dehydrated cow skin). Such treats are hazardous for pets, such as dogs. Chewing on animal based treats results in the pet's saliva rehydrating the treat. However the sections torn or chewed away from such treats can be too large, which poses a choking risk to the pet. Further, these treats can be easily contaminated as they are animal based, which can result in bacterial infection and growth or poisonous components or toxins being transmitted to the pet.

SUMMARY

An aspect of the present disclosure relates to a starch-based flying pet treat. The pet treat compositionally comprises a starch-based edible material such as a cellulose or starch. The treat itself has an overall circular shape in that the treat comprises a center ring providing a first surface area and at least one wing integrally extending from the center ring and providing a second surface area. The first and second surface areas provide an overall circular shape to the treat such that the treat is configured to fly through the air when thrown. The treat may comprise three of the wings, the wing integrally extending from the center ring wherein the wings are spaced equidistant about the center ring are each oriented co-planar to the center ring. The wings also comprise apertures in each wing's surface area to provide a glide ratio to the treat sufficiently high enough for the treat to fly a selected distance when thrown.

Another aspect of the present disclosure relates to the composition of the flying pet treat which is starch-based. The material may comprise a starch comprised of corn starch, rice starch, tapioca starch, potato starch or combinations thereof The pet treat may compositionally further comprise additives for forming the treat and maintaining the treat in the overall circular shape. The treat may also or alternatively compositionally comprise a natural protein, oil, molasses, natural flavor, salt, tocopherol, breath-freshening agents, or combinations thereof.

Yet another aspect of the present disclosure relates to a method of exercising and treating or feeding a pet, such as a dog. The method comprises providing a starch-based flying pet treat compositionally comprising a starch-based edible material and the treat having an overall circular shape formed by a center ring providing a first surface area and at least one wing integrally extending from the center ring and providing a second surface area such that the treat is configured to fly through the air when thrown. The method comprises throwing the starch-based flying pet treat a selected distance through the air and allowing the pet to chase and retrieve the treat. The treat can be thrown for retrieval by the pet one or more times, as selected by a user. After exercising, the pet then chews and/or consumes the flying pet treat.

BRIEF DESCRIPTION OF THE DRAWINGS

FIG. 2 is a back view of the flying pet treat.

DETAILED DESCRIPTION

Figure 1:
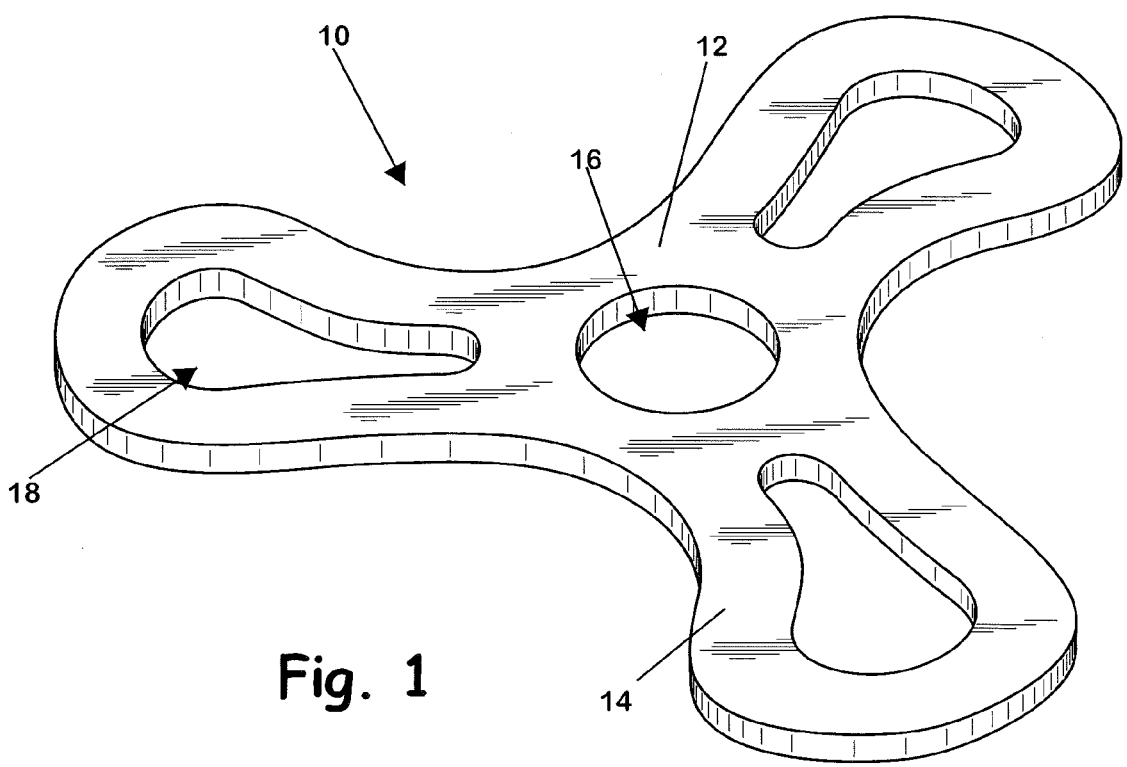
FIG. 1 is a perspective view of a flying pet treat.
Figures 3, 4, 5, 6, 7:
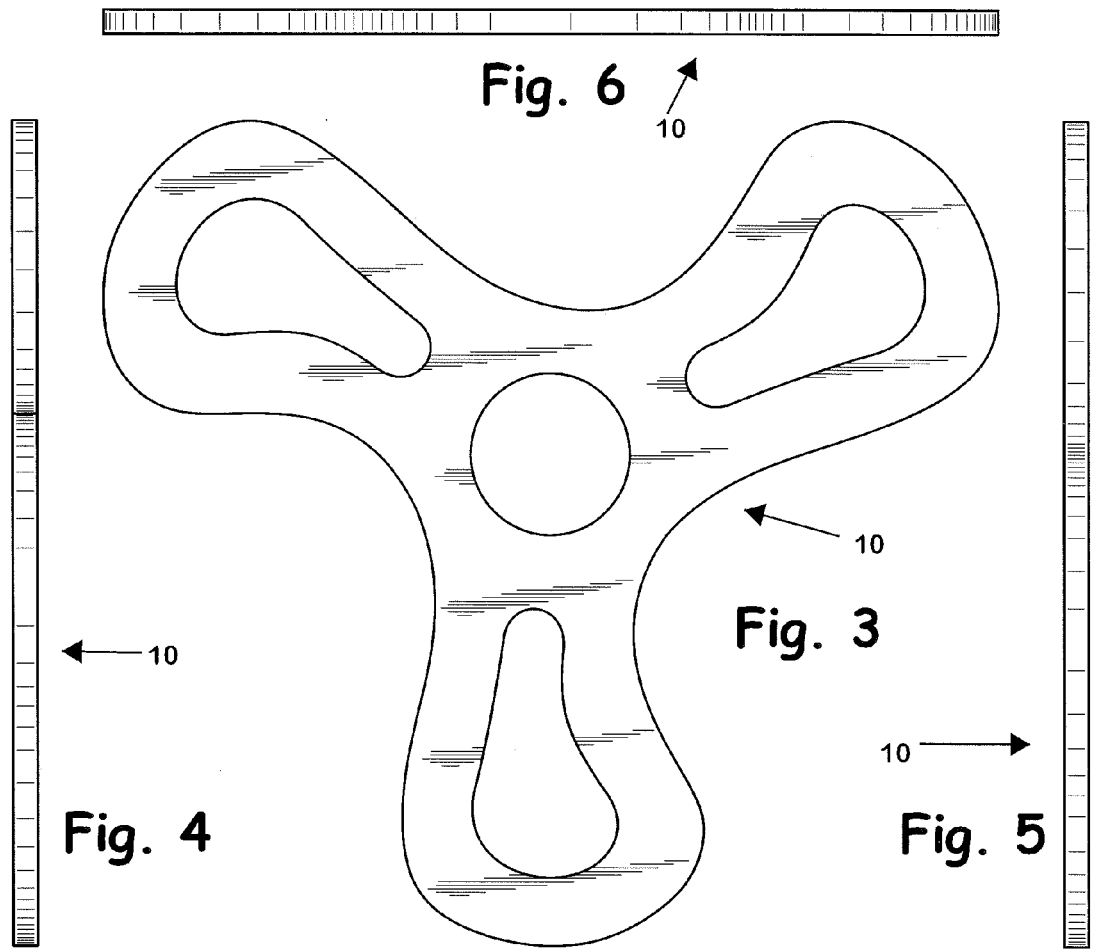
FIG. 3 is a front view of the flying pet treat.
FIG. 4 is a left side view of the flying pet treat.
FIG. 5 is a right side view of the flying pet treat.
FIG. 6 is a top view of the flying pet treat.
FIG. 7 is a bottom view of the flying pet treat.
Figure 8:
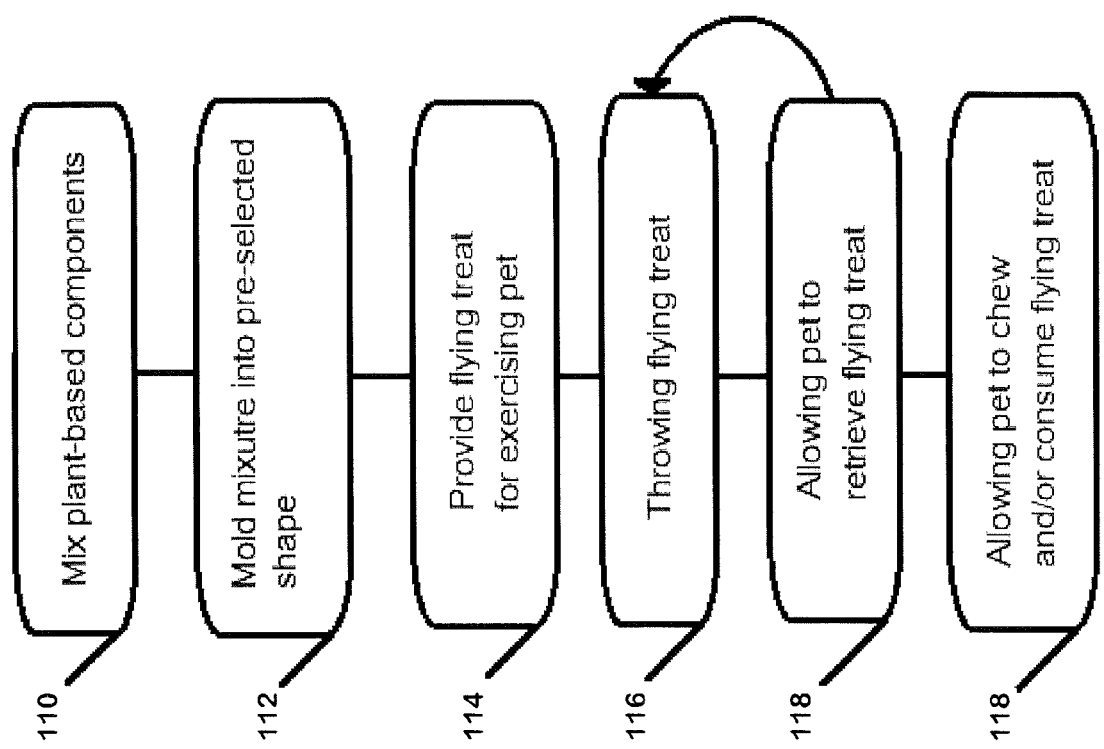
FIG. 8 illustrates a method of forming and using the flying pet treat for exercising a pet.

The flying pet treat of the present disclosure is illustrated generally at 10 in FIGS. 1-3. The flying pet treat is a "throwable" pet treat 10 that may be formed in any one of various shapes configured for gliding, or flying, through the air. By "gliding" what is meant is the device utilizes "lift" to travel similar to an airplane wing. In other words, the device generates a downward force as the device travels through air, thereby prolonging the air travel of the device and the distance travelled. "Throwable" as used throughout this disclosure means that the treat is capable of and configured for being tossed or thrown and actually able to fly or glide through the air. Thus, the treat is throwable and configured to fly a distance corresponding to how hard the treat is thrown. The pet may then chase and catch the treat in the air or otherwise have to forage for the treat. Thus, the treat 10 is configured for flying much the same way a ball or a Frisbee is a flying toy. Example shapes include, but are not limited to, a "boomerang" shape. As illustrated in the figures, the flying pet treat 10 takes the shape of a three winged boomerang. The flying dog treat 10 is also a starch-based treat excluding the incorporation of animal based components. For example, the treat 10 may be a cellulose-based or starch-based dog treat 10.

The flying pet treat 10 illustrated in the figures is a multiple winged boomerang shaped treat configured for flying through the air as a throwable treat. A pet, such as a dog, may chase the thrown treat as a traditional toy and when caught, the pet also enjoys the benefit of a chewable and edible dog treat. As illustrated in FIGS. 1-3, the treat 10 has an overall circular shape 11 with a center ring 12. A plurality of smooth, rounded or curved protrusions, referred to as wings 14 extend from the ring 12. In the embodiment illustrated, the treat 10 has three wings 14 which are spaced circumferentially around the center ring 12. The curved wings 14 are spaced equidistant about and oriented co-planar to the central ring 12, which has a centered aperture 16 therein. Each of the wings 14 may also have an aperture 18 extending along the wing 14 and substantially centered therein. The shape of the aperture 18 may substantially mimic the outer perimeter shape of the wing 14, or make take another form or shape sufficiently allowing the treat 10 to fly through the air.

For ease and comfort of throwing, the treat 10 is formed to have the three curved wings 14 and apertures 16 and 18 to allow the treat 10 to be light weight and aerodynamic The apertures 16 and 18 may also allow pets of various sizes to catch and grip the treat 10 for chewing. The treat 10 may then have a thickness of approximately ¼ inch. The thickness may be greater than ¼ inch or less than ¼ inch, depending on the overall size of the treat 10, wherein the overall thickness and size allows the treat to remain capable of flying through the air and to rotate while moving similarly to a disk or Frisbee when thrown by a user.

The wings 14 and ring 12 may be manufactured as a single unified body and as such may be formed by injection molding, compression molding, die-cast molding or an extrusion process or a combination thereof. As noted above, the wings 14 are formed such that there is no material in their interior portions, forming apertures 18. This allows for a flat, rigid and lightweight treat 10 having a high glide ratio. The glide ration here is defined as the horizontal distance ($D_h$) over the change in altitude ($\Delta A$). The composition or ingredients of the treat (as discussed further below) are mixed and molded or otherwise formed into the selected treat shape. The user throws the treat 10 and a dog fetches the treat 10, and as a result, is rewarded with the treat 10 for consumption. The treat 10 is starch-based, natural and safe for the pet to chew and eventually consume.

In further detail, the treat 10 may be a starch-based injection molded flying chew treat, although additional shapes and designs are contemplated which allow for interaction, exercise and reward. Compositionally, the treat 10 may be comprised of starch, for example, starch components may include corn, rice, potato, tapioca, rye, oats, pea and/or wheat starch. After being sufficiently heated and gelatinized, these starches have the high capacity to retrograde and provide chew treats strong and hard texture. Wheat starch has been found to retain dimensional stability of final treats. Flours may be used as well, examples of which may include but are not limited to rice flours, potato flours, corn flours, pea flours, others and combinations thereof. A variety of oils, examples of which may include canola oil, palm oil, vegetable oil, others and combinations thereof may also be incorporated into the composition. The treat 10 may further comprise a plasticizer. The plasticizer may be glycerin, propylene glycol, or mixtures thereof. Plasticizers are commonly utilized to separate polymer chains to increase the molecular movement, therefore providing chew treats certain degree of flexibility and extensibility, which allows the treat 10 to fly when thrown for exercising an rewarding a pet.

Further, a gelling protein may be included in the composition of the treat 10. A gelatin with the bloom strength between about 100 and about 150 may be incorporated in the treat composition 10 to increase the durability of dental treats. The treat 10 may also contain a sufficient amount of water to fully gelatinize the starch. The treat 10 may also contain a lubricant to promote the automatic ejection of treats 10 from the mold. Examples of the lubricant, may include but are not limited to, vegetable oils, lecithin or its derivatives. The treat 10 may also contain optional ingredients, examples of which include but are not limited to, palatability enhancers, flavoring agents, antioxidants, emulsifiers, dental cleaning agents, fibers, proteins, and essential minerals including such as calcium. Further, pliability enhancer and flavor agents may be utilized to make the treats more attractive to pets such as dogs.

The composition of the pet treat 10 allows the pet treat 10 to be pliable and lightweight for flying through the air when exercising and engaging the pet. The food grade binding components allow the flying pet treat 10 to retain a selected shape upon formation. Thus, compositionally, for example as described previously above, the treat 10 is comprised entirely of edible components safe for consumption by pets and safe for human handling and ingestion such that the treat 10 is fully digestible by the pet.

The flying pet treat 10 described herein may be used for exercising or rewarding a pet. The flying pet treat 10 can be used as a flying treat and also as a chew toy or treat for pets, such as dog. The composition of the pet treat 10 and its ability to fully fly through the air when thrown by a user allows a higher level of stimulation and reward for the pet. The flying pet treat 10 activates the pet's natural instincts of hunting, chasing, tugging, and/or chewing. The treat 10 enables the pet owner to do more than throwing a bone to their dog and increases the engagement and interaction between pet owner and pet. Exercising and rewarding or providing 114 a treat to pet comprises providing a starch-based flying pet treat compositionally comprising a starch-based edible material 110 and the treat being molded or otherwise ;Conned 112 with an overall circular shape formed by a center ring providing a first surface area and at least one wing integrally extending from the center ring and providing a second surface area such that the treat is configured to fly through the air when thrown. Exercising the pet can include throwing the starch-based flying pet treat a selected distance through the air 116 and allowing the pet to chase and retrieve the treat 118 a selected number of times sufficient for the selected exercise level of the pet. The pet may be allowed to chase and retrieve the treat repeatedly and further allowed to chew and consume the treat 120 after exercise or as a reward.

Although the present disclosure has been described with reference to preferred embodiments, workers skilled in the art will recognize that changes may be made in form and detail without departing from the spirit and scope of the disclosure.

The invention claimed is:

1. A starch-based flying pet treat comprising:
   compositionally, a digestible starch-based edible material;
   a center ring providing a first surface area;
   at least one wing integrally extending from the center ring and providing a second surface area; and
   wherein the first and second surface area provide an overall circular shape to the treat such that the treat is configured to fly through the air when thrown.

2. The pet treat of claim 1, and further comprising three wings integrally extending from the center ring.

3. The pet treat of claim 2, wherein the three wings are spaced equidistant about the center ring are each oriented co-planar to the center ring.

4. The pet treat of claim 1, and further comprising at least one aperture in the second surface area such that the second surface area is configured to provide a glide ratio to the treat sufficiently high enough for the treat to fly a selected distance when thrown.

5. The pet treat of claim 1, wherein the at least one wing extends from and is oriented co-planar to the center ring.

6. The pet treat of claim 1, wherein the starch-based edible material comprises corn starch, rice starch, tapioca starch, potato starch, pea starch, wheat starch, or combinations thereof.

7. The pet treat of claim 1, and compositionally further comprising a food grade binder for forming the treat and maintaining the treat in the overall circular shape.

8. The pet treat of claim 1, and compositionally further comprising a natural protein, oil, molasses, natural flavor, salt, tocopherol, breath-freshening agents, or combinations thereof.

9. A method of exercising and rewarding or feeding a pet comprising:
   providing a starch-based flying pet treat compositionally comprising a digestible starch-based edible material and the treat having an overall circular shape formed by a center ring providing a first surface area and at least one wing integrally extending from the center ring and providing a second surface area such that the treat is configured to fly through the air when thrown;
   throwing the starch-based flying pet treat a selected distance through the air; and
   allowing the pet to chase and retrieve the treat.

10. The method of claim 9, and further comprising repeating the step of throwing the starch-based flying pet treat a selected number of times allowing the pet to chase and retrieve the treat and further allowing the pet to chew and consume the treat.

11. The method of claim 9, wherein the treat further comprises three wings integrally extending from the center ring.

12. The method of claim 11, wherein the three wings are spaced equidistant about the center ring are each oriented co-planar to the center portion.

13. The method of claim 9, wherein the treat comprises at least one aperture in the second surface area such that the second surface area is configured to provide a glide ratio to the treat sufficiently high enough for the treat to fly a selected distance when thrown.

14. The method of claim 9, wherein the at least one wing extends from and is oriented co-planar to the center ring.

15. The method of claim 9, wherein the starch-based edible material is a starch comprising corn starch, rice starch, tapioca starch, potato starch or combinations thereof.

16. The method of claim 9, wherein the pet treat compositionally further comprises a plasticizer for forming the treat and maintaining the treat in the overall circular shape.

17. The method of claim 9, wherein the pet treat compositionally further comprises a natural protein, oil, molasses, natural flavor, salt, tocopherol, breath-freshening agents, or combinations thereof.

\* \* \* \* \*